United States Patent
Eichenauer et al.

[11] Patent Number: 5,883,189
[45] Date of Patent: Mar. 16, 1999

[54] THERMOPLASTIC HIGH-GLOSS MOULDING COMPOSITIONS OF THE ABS TYPE

[75] Inventors: Herbert Eichenauer; Edgar Leitz, both of Dormagen, Germany

[73] Assignee: Bayer AG, Germany

[21] Appl. No.: 975,561

[22] Filed: Nov. 21, 1997

[30] Foreign Application Priority Data

Nov. 28, 1996 [DE] Germany .................. 196 49 255.6

[51] Int. Cl.⁶ .................................................. C08L 55/02
[52] U.S. Cl. .............................. 525/71; 525/73; 525/84; 525/86; 525/64; 525/66; 525/67
[58] Field of Search ................................. 525/64, 66, 67, 525/71, 316, 86

[56] References Cited

U.S. PATENT DOCUMENTS

| | | | |
|---|---|---|---|
| 4,430,478 | 2/1984 | Schmidt et al. | 525/71 |
| 4,713,420 | 12/1987 | Henton | 525/236 |
| 4,731,420 | 3/1988 | Hefner, Jr. | 525/430 |
| 5,605,963 | 2/1997 | Leitz et al. | 525/71 |
| 5,719,232 | 2/1998 | Schmidt et al. | 525/86 |
| 5,741,853 | 4/1998 | Eichenauer et al. | 525/71 |

FOREIGN PATENT DOCUMENTS

| | | |
|---|---|---|
| 190 884 | 8/1986 | European Pat. Off. |
| 470 229 | 2/1991 | European Pat. Off. |
| 436 381 | 7/1991 | European Pat. Off. |
| 24 20 357 | 12/1975 | Germany |
| WO 89/05836 | 6/1989 | WIPO |
| WO 91/15544 | 10/1991 | WIPO |

*Primary Examiner*—Mark L. Warzel
*Attorney, Agent, or Firm*—Connolly & Hutz

[57] ABSTRACT

Thermoplastic moulding compositions of the ABS type, containing

I) at least one graft polymer, obtainable by emulsion polymerisation of resin-forming monomers in the presence of a mixture comprising a butadiene polymer latex (A) having a particle diameter $d_{50}$ of $\leq 320$ nm, a particle diameter distribution of 30 to 100 nm in width and a gel content of $\leq 70$ wt. % and a butadiene polymer latex (B) having a particle diameter $d_{50}$ of $\geq 370$ nm, a particle diameter distribution of 50 to 500 nm in width and a gel content of $\geq 270$ wt. %, II) at least one graft polymer, obtainable by emulsion polymerisation of resin-forming monomers in the presence of a butadiene polymer latex (C) having a particle diameter $d_{50}$ of from 110 to 150 nm, a particle diameter distribution of 20 to 50 nm in width and a gel content of from 80 to 98 wt. %, and III) at least one rubber-free copolymer composed of resin-forming monomers and the use of the moulding compositions for the production of mouldings.

6 Claims, No Drawings

THERMOPLASTIC HIGH-GLOSS MOULDING COMPOSITIONS OF THE ABS TYPE

ABS moulding compositions have for many years been used in large quantities as thermoplastic resins for the production of moulded parts of all kinds. Here the range of properties of these resins extends from relatively brittle to very tough.

A special field of application for ABS moulding compositions is the production of moulded parts having a very high surface gloss, for example, of housings and coverings (for example, for telephones, kitchen appliances, domestic appliances).

A problem not hitherto satisfactorily resolved is the provision of products having a very high gloss which, in addition to a very high surface gloss, have an improved notch impact strength and a very good thermoplastic flow behaviour.

ABS moulding compositions having a good surface gloss are known, but they do not meet the extreme requirements described above. Thus, for example, DE-OS 2 420 357 and DE-OS 2 420 358 describe the use of particular graft polymers having defined values for properties including rubber contents, particle size, degree of grafting, the styrene:acrylonitrile ratio in the graft polymers and of the styreneacrylonitrile copolymer used. Despite the relatively intricate production of these moulding compositions, optimal toughness/flow behaviour relationships are not attained.

EP-PS 436 381 also describes glossy ABS moulding compositions based on several rubber components. However, a good toughness/gloss relationship is not achieved in these moulding compositions, because of the proportion of ABS polymer in the composition.

Finally, EP-PS 470 229 describes a process for the production of high-gloss ABS moulding compositions. As in the above-mentioned DE-OS 2 420 357 and DE-OS 2 420 358, a great many specified reaction conditions also have to be maintained here. Satisfactory toughness is obtained only at a very high content of coarse graft polymer, which is expensive to prepare industrially.

It has now been found that products having extremely high gloss values with at the same time very good toughness and workability are obtained through the use of two especially constituted and especially prepared ABS graft rubbers in a resin matrix.

This invention provides improved thermoplastic high-gloss moulding compositions of the ABS type, containing I) at least one graft polymer, which is obtainable by emulsion polymerisation of styrene and acrylonitrile in the weight ratio of 90:10 to 50:50, styrene and/or acrylonitrile being wholly or partly replaceable by α-methylstyrene, methyl methacrylate or N-phenylmaleimide, in the presence of a mixture comprising a butadiene polymer latex (A) having a particle diameter $d_{50}$ of $\leq 320$ nm, preferably of from 260 to 310 nm, a particle diameter distribution (measured as $d_{90}-d_{10}$ from the integral particle diameter distribution) of 30 to 100 nm, preferably of 40 to 80 nm, in width and a gel content of $\leq 70$ wt. %, preferably of from 40 to 65 wt. %, and a butadiene polymer latex (B) having a particle diameter $d_{50}$ of $\geq 370$ mn, preferably of from 380 to 450 nm, a particle diameter distribution (measured as $d_{90}-d_{10}$ from the integral particle diameter distribution) of 50 to 500 nm, preferably of 100 to 400 nm, in width and a gel content of $\geq 70$ wt. %, preferably of from 75 to 90 wt. %, the butadiene polymer latexes each containing copolymerised 0 to 50 wt. % of an additional vinyl monomer and the mass ratio of graft monomers used to butadiene polymers used being from 25:75 to 70:30, II) at least one graft polymer, which is obtainable by emulsion polymerisation of styrene and acrylonitrile in the weight ratio of 90:10 to 50:50, styrene and/or acrylonitrile being wholly or partly replaceable by α-methylstyrene, methyl methacrylate or N-phenylmaleimide, in the presence of a butadiene polymer latex (C) having a particle diameter $d_{50}$ of from 110 to 150 nm, preferably of from 120 to 140 nm, a particle diameter distribution (measured as $d_{90}-d_{10}$ from the integral particle diameter distribution) of 20 to 50 nm, preferably of 25 to 45 nm, in width and a gel content of from 80 to 98 wt. %, preferably of from 85 to 95 wt. %, the butadiene polymer latex containing copolymerised 0 to 50 wt. % of an additional vinyl monomer and the mass ratio of graft monomer used to butadiene polymer used being from 30:70 to 60:40, III) at least one rubber-free copolymer of styrene and acrylonitrile in the weight ratio of 90: 10 to 50:50, styrene and/or acrylonitrile being wholly or partly replaceable by α-methylstyrene, methyl methacrylate or N-phenylmaleimide.

In general the moulding compositions according to the invention may contain from 2.5 to 35 parts by weight, preferably from 5 to 30 parts by weight and particularly preferably from 7.5 to 25 parts by weight of I, from 5 to 40 parts by weight, preferably from 7.5 to 35 parts by weight and particularly preferably from 10 to 30 parts by weight of II and from 25 to 92.5 parts by weight, preferably from 35 to 87.5 parts by weight and particularly preferably from 45 to 82.5 parts by weight of III.

The moulding compositions according to the invention may moreover contain additional rubber-free thermoplastic resins not composed of vinyl monomers, these thermoplastic resins being used in quantities of up to 500 parts by weight, preferably up to 400 parts by weight and particularly preferably up to 300 parts by weight (in each case based on 100 parts by weight of I+II+III).

In the graft polymerisation to prepare component I), a mixture comprising at least two butadiene polymer latexes, at least one each of type (A) and (B), is used. The weight ratio (A):(B), based on the respective solids content of the latexes, is preferably from 90:10 to 10:90, particularly preferably from 60:40 to 30:70.

In the graft polymerisation to prepare component II), a butadiene latex (C) is used which is different from (A) and (B).

The butadiene polymer latexes (A), (B) and (C) can be prepared by emulsion polymerisation of butadiene. This polymerisation is known and is described, for example, in Houben-Weyl, Methoden der Organischen Chemie, Makromolekulare Stoffe, Part 1, page 674 (1961), Thieme Verlag, Stuttgart. Up to 50 wt. % (based on the total quantity of monomers used for the preparation of the butadiene polymer) of one or more monomers copolymerisable with butadiene may be used as comonomers.

Examples of such monomers are isoprene, chloroprene, acrylonitrile, styrene, α-methylstyrene, $C_1$–$C_4$ alkylstyrenes, $C_1$–$C_8$ alkyl acrylates, $C_1$–$C_8$ alkyl methacrylates, alkylene glycol diacrylates, alkylene glycol dimethacrylates, divinylbenzene; preferably butadiene alone is used. In the preparation of (A) and (B) it is also possible first of all to prepare a finely-divided butadiene polymer by known methods and subsequently to agglomerate it in a known manner for the purpose of adjustment to the required particle diameter.

Appropriate techniques are described (cf. EP-PS 0 029 613; EP-PS 0 007 810; DD-PS 144 415; DE-AS 1 233 131; DE-AS 1 258 076; DE-OS 2 101 650; US-PS 1 379 391).

It is equally possible to apply the so-called seed polymerisation technique, wherein a finely-divided butadiene polymer is first of all prepared and then further polymerised to form larger particles by further reaction with monomers containing butadiene.

In principle, the butadiene polymer latexes (A), (B) and (C) can also be prepared by emulsifying finely-divided butadiene polymers in aqueous media (cf. Japanese Patent Application 55 125 102).

The butadiene polymer latex (A) has a particle diameter $d_{50}$ of $\leq 320$ nm, preferably of from 260 to 310 nm, a particle diameter distribution (measured as $d_{90}$–$d_{10}$ from the integral particle diameter distribution) of 30 to 100 nm, preferably of 40 to 80 nm, in width and a gel content of $\leq 70$ wt. %, preferably of from 40 to 65 wt. %.

The butadiene polymer latex (B) has a particle diameter $d_{50}$ of $\geq 370$ nm, preferably of from 380 to 450 nm, a particle diameter distribution (measured as $d_{90}$–$d_{10}$ from the integral particle diameter distribution) of from 50 to 500 nm, preferably of 100 to 400 nm, in width and a gel content of $\geq 70$ wt. %, preferably of from 75 to 90 wt. %.

The butadiene polymer latex (C) has a particle diameter $d_{50}$ of from 110 to 150 nm, preferably of from 120 to 140 nm, a particle diameter distribution (measured as $-d_{90}d_{10}$ from the integral particle diameter distribution) of 20 to 50 nm, preferably of 25 to 45 nm, in width and a gel content of from 80 to 98 wt. %, preferably of from 85 to 95 wt. %.

The average particle diameter $d_{50}$ and the $d_{10}$ and $d_{90}$ values can be determined by ultracentrifugation measurement (cf. W. Scholtan, H. Lange: Kolloid Z. u. Z. Polymere 250, pages 782 to 796 (1972)). The values given for the gel content relate to the determination by the wire cage method on toluene (cf. Houben-Weyl, Methoden der Organischen Chemie, Makromolekulare Stoffe, Part 1, page 307 (1961), Thieme Verlag, Stuttgart).

The gel contents of the butadiene polymer latexes (A), (B) and (C) can be adjusted in a manner known in principle by applying suitable reaction conditions (for example, high reaction temperature and/or a high degree of polymerisation and optionally the addition of cross-linking substances in order to obtain a high gel content or, for example, low reaction temperature and/or termination of the polymerisation reaction before excessive cross-linking has occurred and optionally the addition of molecular-weight controllers such as, for example, n-dodecyl mercaptan or t-dodecyl mercaptan in order to obtain a low gel content). The emulsifiers used may be conventional anionic emulsifiers, for example, alkyl sulphates, alkyl sulphonates, aralkyl sulphonates, soaps of saturated or unsaturated fatty acids and of alkaline disproportionated or hydrogenated abietic acid or tall-oil acid; emulsifiers containing carboxyl groups (for example, salts of $C_{10}$–$C_{18}$ fatty acids, disproportionated abietic acid) are preferably used.

The graft polymerisation for the preparation of the graft polymers I) and II) may be carried out in such a way that the mixture of monomers is added continuously to the mixture of butadiene polymer latexes (A) and (B) and only to the butadiene polymer latex (C) respectively, and is polymerised.

In this connection it is preferable that particular monomer:rubber ratios be maintained and that the monomers be added to the rubber latex in a known manner.

To produce component I) according to the invention, preferably 25 to 70 parts by weight, particularly preferably 30 to 60 parts by weight, of a mixture of styrene and acrylonitrile, which optionally may contain up to 50 wt. % (based on the total quantity of monomers used in the graft polymerisation) of one or more comonomers, is polymerised in the presence of preferably 30 to 75 parts by weight, particularly preferably 40 to 70 parts by weight (in each case referred to solids), of the butadiene polymer latex mixture of (A) and (B).

To produce component II) according to the invention, preferably 30 to 60 parts by weight, particularly preferably 35 to 55 parts by weight, of a mixture of styrene and acrylonitrile, which optionally may contain up to 50 wt. % (based on the total quantity of monomers used in the graft polymerisation) of one or more comonomers, is polymerised in the presence of preferably 40 to 70 parts by weight, particularly preferably 45 to 65 parts by weight (in each case referred to solids), of the butadiene polymer latex (C).

The monomers used in these graft polymerisations are preferably mixtures of styrene and acrylonitrile in the weight ratio of 90:10 to 50:50, particularly preferably in the weight ratio of 65:35 to 75:25, styrene and/or acrylonitrile being wholly or partly replaceable by copolymerisable monomers, preferably α-methylstyrene, methyl methacrylate or N-phenylmaleimide.

Molecular-weight controllers may in addition be used in the graft polymerisation, preferably in quantities of from 0.05 to 2 wt. %, particularly preferably in quantities of from 0.1 to 1 wt. % (in each case based on the total quantity of monomers in the graft polymerisation step).

Examples of suitable molecular-weight controllers are alkyl mercaptans such as n-dodecyl mercaptan, t-dodecyl mercaptan; dimeric α-methylstyrene; terpinolene.

Suitable initiators are inorganic and organic peroxides, for example, $H_2O_2$, di-tert. butyl peroxide, cumene hydroperoxide, dicyclohexyl percarbonate, tert. butyl hydroperoxide, p-menthane hydroperoxide, azo initiators such as azobisisobutyronitrile, inorganic per-salts such as ammonium persulphate, sodium persulphate or potassium persulphate, sodium perborate and also redox systems. Redox systems generally consist of an organic oxidising agent and a reducing agent, with the possible additional presence of heavy metal ions in the reaction medium (see Houben-Weyl, Methoden der Organischen Chemie, Volume 14/1, pages 263 to 297).

The polymerisation temperature is from 25° C. to 160° C., preferably from 40° C. to 90° C. Suitable emulsifiers are given above.

To produce component I) according to the invention, the graft polymerisation is carried out preferably by introducing the monomers in such a way that within the first half of the total period for the introduction of the monomers, 55 to 90 wt. %, preferably 60 to 80 wt. % and particularly referably 65 to 75 wt. % of the total monomers to be used in the graft polymerisation is added; the remaining proportion of monomers is added during the second half of the total period for the introduction of the monomers.

Copolymers of styrene and acrylonitrile in the weight ratio of 90:10 to 50:50 are preferably used as rubber-free copolymers III), styrene and/or acrylonitrile being wholly or partly replaceable by α-methylstyrene, methyl methacrylate or N-phenylmaleinide.

These copolymers have average molecular weights $\overline{M}_w$, preferably of from 20,000 to 200,000 and intrinsic viscosities [η] of from 20 to 110 ml/g (measured in dimethylformamide at 25° C.).

Details of the preparation of these resins are given, for example, in DE-AS 2 420 358 and in DE-AS 2 724 360. Vinyl resins prepared by bulk polymerisation or solution polymerisation have proved particularly worthwhile.

Besides thermoplastic resins synthesised from vinyl monomers, it is also possible to use polycondensates, for example, aromatic polycarbonates, aromatic polyester carbonates, polyesters or polyamides, as the rubber-free copolymer in the moulding compositions according to the invention.

Suitable thermoplastic polycarbonates and polyester carbonates are known (cf., for example, DE-AS 1 495 626, DE-OS 2 232 877, DE-OS 2 703 376, DE-OS 2 714 544, DE-OS 3 000 610, DE-OS 3 832 396, DE-OS 3 077 934), for example, they can be prepared by the reaction of diphenols corresponding to formulae (I) and (II).

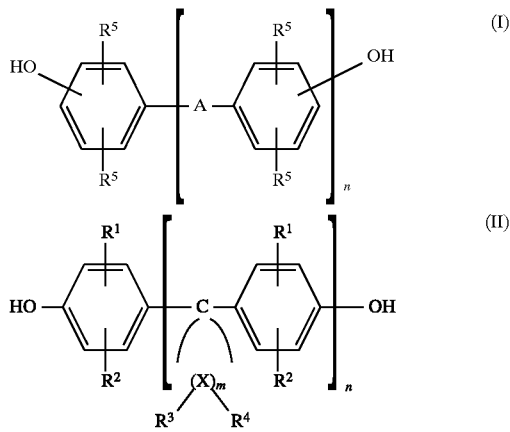

wherein
- A is a single bond, $C_1$–$C_5$ alkylene, $C_2$–$C_5$ alkylidene, $C_5$–$C_6$ cycloalkylidene, —O—, —S—, —SO—, —$SO_2$— or —CO—,
- $R^5$ and $R^6$ independently of one another represent hydrogen, methyl or halogen, in particular hydrogen, methyl, chlorine or bromine,
- $R^1$ and $R^2$ independently of one another denote hydrogen; halogen, preferably chlorine or bromine; $C_1$–$C_8$ alkyl, preferably methyl, ethyl; $C_5$–$C_6$ cycloalkyl, preferably cyclohexyl; $C_6$–$C_{10}$ aryl, preferably phenyl; or $C_7$–$C_{12}$ aralkyl, preferably phenyl-$C_1$–$C_4$ alyl, in particular benzyl,
- m is an integer from 4 to 7, preferably 4 or 5,
- n is 0 or 1,
- $R^3$ and $R^4$ may be selected individually for each X and independently of one another denote hydrogen or $C_1$–$C_6$ alkyl and
- X denotes carbon, with carbonic halides, preferably phosgene, and/or with aromatic dicarboxylic acid dihalides, preferably benzenedicarboxylic acid dihalides, by phase interface polycondensation or with phosgene by polycondensation in homogeneous phase (the so-called pyridine process), the molecular weight being adjustable in known manner by an appropriate quantity of known chain stoppers.

Suitable diphenols corresponding to formulae (I) and (II) are, for example, hydroquinone, resorcinol, 4,4'-dihydroxydiphenyl, 2,2-bis(4-hydroxyphenyl)propane, 2,4-bis(4-hydroxyphenyl)-2-methylbutane, 2,2-bis(4-hydroxy-3,5-dimethylphenyl)propane, 2,2-bis(4-hydroxy-3,5-dichlorophenyl)propane, 2,2-bis(4-hydroxy-3,5-dibromophenyl)propane, 1,1-bis(4-hydroxyphenyl) cyclohexane, 1,1-bis(4-hydroxyphenyl-3,3,5-trimethylcyclohexane, 1,1-bis(4-hydroxyphenyl)-3,3-dimethylcyclohexane, 1,1-bis(4-hydroxyphenyl)-3,3,5,5-tetramethylcyclohexane or 1,1-bis(4-hydroxyphenyl)-2,4,4-trimethylcyclopentane.

Preferred diphenols corresponding to formula (I) are 2,2-bis(4-hydroxyphenyl)propane and 1,1-bis(4-hydroxyphenyl)cyclohexane. The preferred phenol corresponding to formula (II) is 1,1-bis(4-hydroxyphenyl)-3,3,5-trimethylcyclohexane.

Mixtures of diphenols may also be used.

Examples of suitable chain stoppers are phenol, p-tert. butylphenol, long-chain alkylphenols such as 4-(1,3-tetramethylbutyl)phenol according to DE-OS 2 842 005, monoalkylphenols, dialkylphenols having a total of 8 to 20 C atoms in the alkyl substituents according to DE-OS 3 506 472, such as p-nonylphenol, 2,5-di-tert. butylphenol, p-tert. octylphenol, p-dodecylphenol, 2-(3,5-dimethylheptyl) phenol and 4-(3,5-dimethylheptyl)phenol. The required quantity of chain stoppers is generally from 0.5 to 10 mol-%, based on the sum of diphenols (I) and (II).

Suitable polycarbonates and polyester carbonates may be linear or branched; branched products are preferably obtained by the incorporation of 0.05 to 2.0 mol-%, based on the sum of the diphenols used, of compounds which are trifunctional or more than trifunctional, for example, those having three or more than three phenolic OH groups.

Suitable polycarbonates and polyester carbonates may contain aromatically bonded halogen, preferably bromine and/or chlorine; they are preferably halogen-free.

They have average molecular weights ($\overline{M}_w$, weight average) of from 10,000 to 200,000, preferably from 20,000 to 80,000, determined, for example, by ultracentrifugation or measurement of scattered light.

Suitable thermoplastic polyesters are preferably polyalkylene terephthalates, that is, reaction products of aromatic dicarboxylic acids or the reactive derivatives thereof (for example, dimethyl esters or anhydrides) and aliphatic, cycloaliphatic or arylaliphatic diols and mixtures of such reaction products.

Preferred polyalkylene terephthalates can be prepared by known methods from terephthalic acid (or the reactive derivatives thereof) and aliphatic or cycloaliphatic diols having 2 to 10 C atoms (Kunststoff Handbuch, Volume XIII, pages 695 ff., Carl Hanser Verlag, Munich, 1973).

In preferred polyalkylene terephthalates, 80 to 100 mol-%, preferably 90 to 100 mol-% of the dicarboxylate groups are terephthalate groups and 80 to 100 mol-%, preferably 90 to 100 mol-% of the diol groups are ethylene glycol groups and/or 1,4-butanediol groups.

The preferred polyalkylene terephthalates may contain, in addition to ethylene glycol groups or 1,4-butanediol groups, 0 to 20 mol-% of groups of other aliphatic diols having 3 to 12 C atoms or of cycloaliphatic diols having 6 to 12 C atoms, for example, groups of 1,3-propanediol, 2-ethyl-1,3-propanediol, neopentyl glycol, 1,5-pentanediol, 1,6-hexanediol, 1,4-cyclohexanedimethanol, 3-methyl-1,3-pentanediol and 3-methyl-1,6-pentanediol, 2-ethyl-1,3-hexanediol, 2,2-diethyl-1,3-propanediol, 2,5-hexanediol, 1,4-di(β-hydroxyethoxy)benzene, 2,2-bis(4-hydroxycyclohexyl)propane, 2,4-dihydroxy-1,1,3,3-tetramethylcyclobutane, 2,2-bis(3-β-hydroxyethoxyphenyl)propane and 2,2-bis(4-hydroxypropoxyphenyl)propane (DE-OS 2 407 647, 2 407 776 and 2 715 932).

The polyalkylene terephthalates may be branched by the incorporation of relatively small quantities of trihydric or tetrahydric alcohols or of tribasic or tetrabasic carboxylic acids, of the type described in DE-OS 1 900 270 and in US-PS 3 692 744. Examples of preferred branching agents are trimesic acid, trimellitic acid, trimethylolethane and trimethylolpropane and pentaerythritol. It is advisable to use not more than 1 mol-% of the branching agent, based on the acid component.

Particularly preferred polyalkylene terephthalates are those which have been prepared only from terephthalic acid and the reactive derivatives thereof (for example, the dialkyl esters thereof) and ethylene glycol and/or 1,4-butanediol, and mixtures of these polyalkylene terephthalates.

Preferred polyalkylene terephthalates also include copolyesters prepared from at least two of the above-mentioned alcohol components: poly(ethylene glycol/1,4-butanediol) terephthalates are particularly preferred copolyesters.

The preferred polyalkylene terephthalates generally have an intrinsic viscosity of from 0.4 to 1.5 dl/g, preferably from 0.5 to 1.3 dl/g, particularly from 0.6 to 1.2 dl/g, in each case measured in phenol/o-dichlorobenzene (1:1 parts by weight) at 25° C.

Suitable polyamides are known homopolyamides, copolyamides and mixtures of these polyamides. They may be partly crystalline and/or amorphous polyamides.

Suitable partly crystalline polyamides are polyamide 6, polyamide 6,6, mixtures and corresponding copolymers of these components. Also suitable are those partly crystalline polyamides the acid components of which consist wholly or partly of terephthalic acid and/or isophthalic acid and/or suberic acid and/or sebacic acid and/or azelaic acid and/or adipic acid and/or cyclohexanedicarboxylic acid, and the diamine components of which consist wholly or partly of m- and/or p-xylylenediamine and/or hexamethylenediamine and/or 2,2,4-trimethylhexamethylenediamine and/or 2,2,4-trimethylhexamethylenediamine and/or isophoronediamine, and the composition of which is known in principle.

In addition, mention may be made of polyamides prepared wholly or partly from lactams having 7 to 12 C atoms in the ring, optionally with the concomitant use of one or more of the above-mentioned starting components.

Polyamide 6 and polyamide 6,6 and their mixtures are particularly preferred partly crystalline polyamides. Known products may be used as amorphous polyamides. They are obtained by polycondensation of diamines such as ethylenediamine, hexamethylenediamine, decamethylenediamine, 2,2,4- and/or 2,4,4-trimethylhexamethylenediamine, m- and/or p-xylylenediamine, bis(4-aminocyclohexyl)methane, bis(4-aminocyclohexyl)propane, 3,3'-dimethyl-4,4'-diaminodicyclohexylmethane, 3-aminomethyl-3,3,5-trimethylcyclohexylamine, 2,5- and/or 2,6-bis(aminomethyl)norbornene and/or 1,4-diaminomethylcyclohexane with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid.

Copolymers obtained by polycondensation of several monomers are also suitable, also copolymers prepared with the addition of aminocarboxylic acids such as ε-aminocaproic acid, ω-aminoundecanoic acid or w-aminolauric acid or the lactams thereof.

Particularly suitable amorphous polyamides are the polyamides prepared from isophthalic acid, hexamethylenediamine and from other diamines such as 4,4'-diaminocyclohexylmethane, isophoronediamine, 2,2,4- and/or 2,4,4-trimethylhexamethylenediamine, 2,5- and/or 2,6-bis(aminomethyl)norbornene; or from isophthalic acid, 4,4'-diaminodicyclohexylmethane and ε-caprolactam; or from isophthalic acid, 3,3'-dimethyl-4,4'-diaminodicyclohexylmethane and lauryl lactam; or from terephthalic acid and the mixture of isomers of 2,2,4- and/or 2,4,4-trimethylhexamethylenediamine.

Instead of the pure 4,4'-diaminodicyclohexylmethane, one may also use mixtures of the positional isomers of diaminodicyclohexylmethane, consisting of 70 to 99 mol-% of the 4,4'-diamino isomer 1 to 30 mol-% of the 2,4'-diamino isomer 0 to 2 mol-% of the 2,2'-diamino isomer and optionally corresponding higher condensed diamines, which are obtained by hydrogenation of diaminodiphenylmethane of technical grade. Up to 30% of the isophthalic acid may be replaced by terephthalic acid.

The polyamides have a relative viscosity (measured on a 1 wt. % solution in m-cresol at 25° C.) preferably of from 2.0 to 5.0, particularly preferably from 2.5 to 4.0.

Preferred moulding compositions according to the invention contain from 2.5 to 35 parts by weight, preferably from 5 to 30 parts by weight and particularly preferably from 7.5 to 25 parts by weight of the graft polymer component I), from 5 to 40 parts by weight, preferably from 7.5 to 35 parts by weight and particularly preferably from 10 to 30 parts by weight of the graft polymer component II) and from 25 to 92.5 parts by weight, preferably from 35 to 87.5 parts by weight and particularly preferably from 45 to 82.5 parts by weight of the rubber-free copolymer III).

If in addition other rubber-free thermoplastic resins not composed of vinyl monomers are used, the quantities of these constitute up to 500 parts by weight, preferably up to 400 parts by weight and particularly preferably up to 300 parts by weight (in each case based on 100 parts by weight of I)+II)+III)).

The production of the moulding compositions according to the invention is carried out by mixing components I), II) and III) in conventional mixing units (preferably in multiroll mills, mixing extruders or internal kneaders).

The required or recommended additives may be introduced into the moulding compositions according to the invention in the course of production, working up, further processing and final shaping. These additives include, for example, antioxidants, UV stabilisers, peroxide inhibitors, antistatic agents, lubricants, mould release agents, flame proofing agents, fillers or reinforcing agents (glass fibres, carbon fibres, et cetera), colorants.

The final shaping may be carried out in commercially available processing units and includes, for example, injection moulding, sheet extrusion with optional subsequent hot forming, cold forming, extrusion of tubes and sections, calendering.

In the following Examples, the parts given are invariably parts by weight and the % given invariably wt. %, unless specified otherwise.

EXAMPLES

Components

ABS graft polymer 1 (Component I)

29 parts by weight (calculated as solid substance) of an anionically emulsified polybutadiene latex prepared by radical polymerisation and having a $d_{50}$ value of 282 nm, a $d_{90}$–$d_{10}$ value of 48 nm and a gel content of 49 wt. % and 29 parts by weight (calculated as solid substance) of an anionically emulsified polybutadiene latex prepared by radical polymerisation and having a $d_{50}$ value of 432 nm, a $d_{90}-d_{10}$ value of 128 nm and a gel content of 81 wt. % are adjusted with water to a solids content of approx. 20 wt. %, for which the mixture is heated to 63° C., and 0.5 part by weight of potassium peroxydisulphate (dissolved in water) is added thereto. 42 parts by weight of a mixture of 73 wt. % styrene and 27 wt. % acrylonitrile and 0.1 part by weight of tert. dodecyl mercaptan are then added over a period of 4 hours in such a way that within the first 2 hours 70 wt. % of the total quantity of monomers is added to the reaction mixture. Parallel with this, 1 part by weight (calculated as solid substance) of the sodium salt of a resin acid mixture (Dresinate 731, dissolved in alkaline adjusted water) is added over a period of 4 hours. After a further reaction time of 4 hours, following addition of approx. 1.0 part by weight of a phenolic antioxidant, the graft latex is coagulated with a magnesium sulphate/acetic acid mixture and, after washing with water, the resulting powder is dried at 70° C. in a vacuum.

ABS graft polymer 2 (Comparison material, not according to the invention)

The procedure described under "ABS graft polymer 1" was repeated, with 58 parts by weight (calculated as solid substance) of the polybutadiene latex having a $d_{50}$ value of 282 nm, a $d_{90}-d_{10}$ value of 48 nm and a gel content of 49 wt. % being used instead of the polybutadiene latex mixture.

ABS graft polymer 3 (Comparison material, not according to the invention)

The procedure described under "ABS graft polymer 1" was repeated, with 58 parts by weight (calculated as solid substance) of the polybutadiene latex having a $d_{50}$ value of 432 nm, a $d_{90}-d_{10}$ value of 128 nm and a gel content of 81 wt. % being used instead of the polybutadiene latex mixture.

ABS graft polymer 4 (Component II)

50 parts by weight (calculated as solid substance) of an anionically emulsified polybutadiene latex prepared by radical polymerisation and having a $d_{50}$ value of 129 nm, a $d_{90}-d_{10}$ value of 33 nm and a gel content of 89 wt. % is adjusted with water to a solids content of approx. 20 wt. %, for which it is heated to 63° C., and 0.5 parts by weight of potassium peroxydisulphate (dissolved in water) is added thereto. 50 parts by weight of a mixture of 73 wt. % styrene and 27 wt. % acrylonitrile is then added over a period of 4 hours. Parallel with this, 1 part by weight (calculated as solid substance) of the sodium salt of a resin acid mixture (Dresinate 731, dissolved in alkaline adjusted water) is added over a period of 4 hours. After a further reaction time of 4 hours, following addition of approx. 1.0 part by weight of a phenolic antioxidant, the graft latex is coagulated with a magnesium sulphate/acetic acid mixture and, after washing with water, the resulting powder is dried at 70° C. in a vacuum.

ABS graft polymer 5 (Comparison material, not according to the invention)

The procedure described under "ABS graft polymer 4" was repeated, with a polybutadiene latex having a $d_{50}$ value of 127 nm, a $d_{90}-d_{10}$ value of 63 nm and a gel content of 75 wt. % being used.

Resin component (Component III)

Statistical styrene/acrylonitrile copolymer (styrene:acrylonitrile weight ratio 72:28) having an $\overline{M}_w$ of approx. 85,000 and $\overline{M}_w/\overline{M}_n-1 \leq 2$ obtained by radical solution polymerisation.

Resin component 2 (Component III)

Statistical α-methylstyrene/acrylonitrile copolymer (α-methylstyrene:acrylonitrile weight ratio 72:28) having an $\overline{M}_w$ of approx. 75,000 and $\overline{M}_w/\overline{M}_n-1$ approx. 2 obtained by emulsion polymerisation.

Moulding compositions

The polymer components described above are mixed, in the proportions given in Table 1, with 2 parts by weight ethylenediamine bisstearylamide (Examples 1 to 4), 2 parts by weight pentaerythritol tetrastearate (Examples 5 to 12), 0.5 part by weight magnesium stearate (Examples 5 to 8) and 0.1 part by weight of a silicone oil (Examples 1 to 8) in an internal kneader. After granulation, the mixture is shaped into test rods and into a flat sheet (for assessment of the surface).

The following data were determined:

Notch impact strength at room temperature ($a_k^{RT}$) and at −40° C. ($a_k^{-40° C}$) in accordance with ISO 180/1A (unit: kJ/m$^2$); ball-puncture resistance ($H_C$) in accordance with DIN 53456 (unit: N/mm$^2$); heat deflection temperature (Vicat B) in accordance with DIN 53460 (unit: °C.); thermoplastic flow behaviour (MVI) in accordance with DIN 53735U (unit: cm$^3$/10 min) and surface gloss in accordance with DIN 67530 at an angle of reflection of 20° (reflectometer value).

It may be seen from the Examples (for test data, see Table 2) that the moulding compositions according to the invention are distinguished by having very high gloss values and good values for the toughness (in particular at low temperature), flow behaviour and ball-puncture resistance (modulus of elasticity). It may also be seen (see Examples 9 to 12), that the advantages of the invention are also obtained in the production of heat-resistant ABS product formulations.

TABLE 1

| | Components of the moulding compositions | | | | | | |
|---|---|---|---|---|---|---|---|
| Example | ABS graft polymer 1 (pts by wt.) | ABS graft polymer 2 (pts by wt.) | ABS graft polymer 3 (pts by wt.) | ABS graft polymer 4 (pts by wt.) | ABS graft polymer 5 (pts by wt.) | Resin component 1 (pts by wt.) | Resin component 2 (pts by wt.) |
| 1 | 15 | — | — | 15 | — | 70 | — |
| 2 (comp.) | — | 15 | — | 15 | — | 70 | — |
| 3 (comp.) | — | — | 15 | 15 | — | 70 | — |
| 4 (comp.) | 15 | — | — | — | 15 | 70 | — |
| 5 | 18.75 | — | — | 18.75 | — | 62.5 | — |
| 6 (comp.) | — | 18.75 | — | 18.75 | — | 62.5 | — |
| 7 (comp.) | — | — | 18.75 | 18.75 | — | 62.5 | — |
| 8 (comp.) | 18.75 | — | — | — | 18.75 | 62.5 | — |
| 9 | 21 | — | — | 9 | — | 40 | 30 |

TABLE 1-continued

Components of the moulding compositions

| Example | ABS graft polymer 1 (pts by wt.) | ABS graft polymer 2 (pts by wt.) | ABS graft polymer 3 (pts by wt.) | ABS graft polymer 4 (pts by wt.) | ABS graft polymer 5 (pts by wt.) | Resin component 1 (pts by wt.) | Resin component 2 (pts by wt.) |
|---|---|---|---|---|---|---|---|
| 10 (comp.) | — | 21 | — | 9 | — | 40 | 30 |
| 11 (comp.) | — | — | 21 | 9 | — | 40 | 30 |
| 12 (comp.) | 21 | — | — | — | 9 | 40 | 30 |

TABLE 2

Test data for moulding compositions

| Example | $a_K^{RT}$ (kJ/m²) | $a_K^{-40°C.}$ (kJ/m²) | $H_c$ (N/mm²) | Vicat B (°C.) | MVI (cm³/10 min) | Degree of gloss |
|---|---|---|---|---|---|---|
| 1 | 16.2 | 7.7 | 107 | 99 | 37.4 | 97 |
| 2 (comp.) | 14.5 | 6.2 | 101 | 99 | 35.1 | 94 |
| 3 (comp.) | 15.9 | 6.6 | 108 | 100 | 36.7 | 93 |
| 4 (comp.) | 15.0 | 6.4 | 103 | 98 | 34.9 | 93 |
| 5 | 26.8 | 16.5 | 94 | 99 | 20.7 | 95 |
| 6 (comp.) | 20.5 | 8.5 | 91 | 99 | 18.8 | 93 |
| 7 (comp.) | 22.5 | 9.9 | 94 | 100 | 20.4 | 92 |
| 8 (comp.) | 21.8 | 9.0 | 92 | 99 | 18.8 | 93 |
| 9 | 22.5 | 10.0 | 103 | 105 | 8.7 | 93 |
| 10 (comp.) | 17.5 | 7.2 | 97 | 104 | 8.4 | 90 |
| 11 (comp.) | 18.1 | 7.6 | 102 | 105 | 9.0 | 88 |
| 12 (comp.) | 18.8 | 7.8 | 98 | 104 | 8.5 | 88 |

We claim:

1. A thermoplastic moulding composition comprising:
   I) at least one graft polymer obtained by an emulsion polymerisation of styrene and arcylonitrile in a weight ratio of 90:10 to 50:50, wherein the styrene and/or the acrylonitrile can be wholly or partly replaced by α-methylstyrene, methyl methacrylate or N-phenylmaleimide, in the presence of a mixture comprising a butadiene polymer latex (A) having a particle diameter $d_{50}$ of ≦320 nm, a particle diameter distribution width of 30 to 100 nm when measured as $d_{90}$–$d_{10}$ from the integral particle diameter distribution, and a gel content of ≦70%, and a butadiene polymer latex (B) having a particle diameter $d_{50}$ of ≧370 nm, a particle diameter distribution width of 50 to 500 nm when measured as $d_{90}$–$d_{10}$ from the integral particle diameter distribution, and a gel content of ≧70 wt. %, the butadiene polymer latices each containing copolymerised 0 to 50 wt. % of an additional vinyl monomer and the mass ratio of graft monomers used to butadiene polymers used being 25:75 to 70:30,
   II) at least one graft polymer obtained by an emulsion polymerisation of styrene and acrylonitrile in a weight ratio of 90:10 to 50:50, wherein the styrene and/or the acrylonitrile can be wholly or partly replaced by α-methylstyrene, methyl methacrylate or N-phenylmaleimide, in the presence of a butadiene polymer latex (C) having a particle diameter $d_{50}$ of 110 to 150 nm, a particle diameter distribution width of 20 to 50 nm when measured as $d_{90}$–$d_{10}$ from the integral particle distribution, and a gel content of 80 to 90 wt. %, the butadiene polymer latex containing copolymerised 0 to 50 wt. % of an additional vinyl monomer and the mass ratio of graft monomer used to butadiene polymer used being 30:70 to 60:40, and
   III) at least one rubber-free copolymer of styrene and acrylonitrile in a weight ratio of 90:10 to 50:50, the styrene and/or the acrylonitrile being optionally replaced wholly or partly by α-methylstyrene, methyl methacrylate or N-phenyl-maleimide.

2. A thermoplastic moulding composition according to claim 1, wherein the graft polymer I) is prepared by introducing the monomers into the mixture of the butadiene polymer latices (A) and (B) such that 55 to 90 wt. % of the monomers are added within the first half of the monomer addition time.

3. A thermoplastic moulding composition comprising:
   I) at least one graft polymer obtained by an emulsion polymerisation of styrene and acrylonitrile in a weight ratio of 90:10 to 50:50, the styrene and/or the acrylonitrile being optionally replaced wholly or partly by α-methylstyrene, methyl methacrylate or N-phenylmaleimide, in the presence of a mixture comprising a butadiene polymer latex (A) having a particle diameter $d_{50}$ of 260 to 310 nm, a particle diameter distribution width of 40 to 80 nm when measured as $d_{90}$–$d_{10}$ from the integral particle diameter distribution, and a gel content of 40 to 65 wt. %, and a butadiene polymer latex (B) having a particle diameter $d_{50}$ of 380 to 450 nm, a particle diameter distribution width of 100 to 400 nm when measured as $d_{90}$–$d_{10}$ from the integral particle diameter distribution, and a gel content of 75 to 90 wt. %, the butadiene polymer latices each containing copolymerised 0 to 50 wt. % of an additional vinyl monomer and the mass ratio of graft monomers used to butadiene polymers used being 25:75 to 70:30,
   II) at least one graft polymer obtained by an emulsion polymerisation of styrene and acrylonitrile in a weight ratio of 90:10 to 50:50, the styrene and/or the acrylonitrile being optionally replaced wholly or partly by α-methylstyrene, methyl methacrylate or N-phenylmaleimide, in the presence of a butadiene polymer latex (C) having a particle diameter $d_{50}$ of 120 to 140 nm, a particle diameter distribution width of 25 to 45 nm when measured as $d_{90}$–$d_{10}$ from the integral particle distribution, and a gel content of 80 to 90 wt. %, the butadiene polymer latex containing copolymerised 0 to 50 wt. % of an additional vinyl monomer and the mass ratio of graft monomer used to butadiene polymer used being 30:70 to 60:40, and
   III) at least one rubber-free copolymer of styrene and acrylonitrile in a weight ratio of 90:10 to 50:50, the styrene and/or the acrylonitrile being optionally replaced wholly or partially by α-methylstyrene, methyl methacrylate or N-phenylmaleimide.

4. A thermoplastic moulding composition according to claim 3, wherein the graft polymer I) is prepared by introducing the monomers into the mixture of the butadiene polymer latices (A) and (B) such that 60 to 80 wt. % of the monomers are added within the first half of the monomer addition time.

5. A thermoplastic moulding composition according to claim 1, further including at least one resin selected from the group consisting of an aromatic polycarbonate, an aromatic polyester carbonate, a polyester and a polyamide.

6. A moulding prepared from the thermoplastic moulding compsition according to claim 1.

* * * * *